United States Patent [19]

Czernichow

[11] Patent Number: 4,986,350
[45] Date of Patent: Jan. 22, 1991

[54] DEVICE FOR THE SEISMIC MONITORING OF AN UNDERGROUND DEPOSIT

[75] Inventor: Jean Czernichow, Chatenay Malabry, France

[73] Assignees: Institut Francais du Petrole, Rueil Malmaison; Total Compagnie Francais des Petroles, Paris; Compagnie Generale de Geophysique, Massy; Service Nationale Dit: Gaz de France, Paris; Societe Nationale Elf Aquitaine, Courbevoie, all of France

[21] Appl. No.: 477,503

[22] Filed: Feb. 9, 1990

[30] Foreign Application Priority Data

Feb. 9, 1989 [FR] France ................. 89 01796

[51] Int. Cl.⁵ .................. E21B 47/00; E21B 47/12; G01V 1/00
[52] U.S. Cl. .................. 166/65.1; 367/25; 367/35; 181/122; 73/155
[58] Field of Search .................. 166/65.1, 249, 250, 166/254; 33/1 HH; 181/102, 104, 106, 122, 105; 367/25, 35; 73/155

[56] References Cited

U.S. PATENT DOCUMENTS

| | | | |
|---|---|---|---|
| 2,829,190 | 4/1958 | Comlossy, Jr. | 166/65.1 X |
| 4,200,297 | 4/1980 | Tricon | 166/65.1 X |
| 4,388,969 | 6/1983 | Marshall et al. | 166/65.1 X |
| 4,775,009 | 10/1988 | Wittrisch et al. | 166/285 X |
| 4,893,290 | 1/1990 | McNeel et al. | 181/102 X |

FOREIGN PATENT DOCUMENTS 2187218 9/1987 United Kingdom .

Primary Examiner—Stephen J. Novosad
Attorney, Agent, or Firm—Antonelli, Terry, Stout & Kraus

[57] ABSTRACT

For seismic monitoring of a petroleum deposit at least one signal receiving unit is fixed to an outside of a casing pipe before the casing plate is cemented in a borehole passing through the monitored zone.

At least one housing, defined by projecting elements, (longitudinal members, stops), is provided along an outer surface of the casing pipe, with the where the reception unit being embedded and fixed therein so as to protect the reception unit from shocks or compressive forces which may occur during lowering of the pipe into the well. Each reception unit comprises a support assembly with cavities for sensors, electronic cards for amplifying the signals delivered by the sensors and a sealed external case which is easy to position and which is held firmly in position by embedment in the housing. A multiconductor cable is used, for example, for connecting the reception unit to the surface.

14 Claims, 2 Drawing Sheets

FIG.2
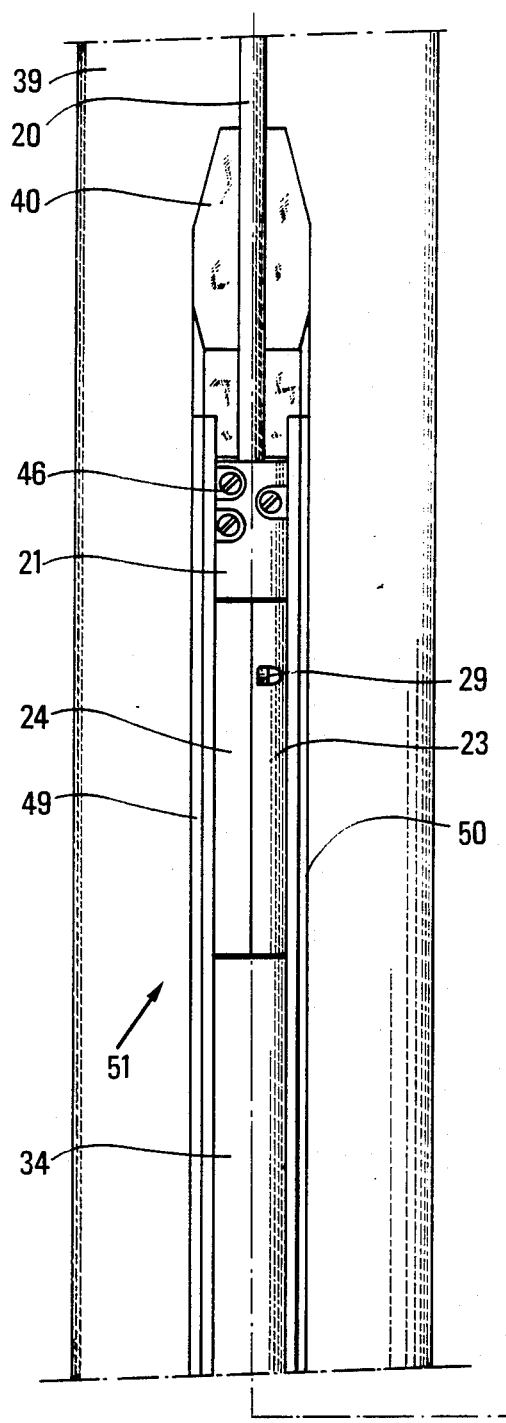
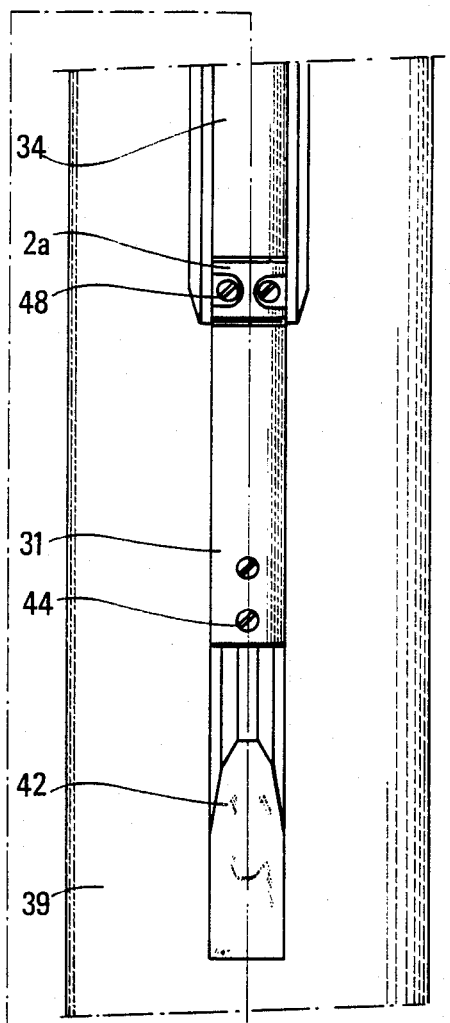

DEVICE FOR THE SEISMIC MONITORING OF AN UNDERGROUND DEPOSIT

BACKGROUND OF THE INVENTION

1. Field of the Invention

The invention relates to an improved device for the seismic monitoring of an underground deposit, adapted to be installed in a production well for making measurements of very different kinds. The device of the invention is particularly suitable for checking the state of wells, monitoring flowrates in wells or else making seismic recordings which may indicate the evolution in time of the monitored production zone etc. It finds its applications particularly in the monitoring of an oil deposit.

2. Description of the Prior Art

From the U.S. Pat. No. 4,775,009, a method is known for installing a set of sensors in a well which, for the needs of petroleum fluid production, is equipped with a casing pipe sealed in the well by cementing. In this method, sensors are disposed outside the pipe. Once the latter is positioned in the well, it is sealed by injecting cement. The sensors are buried in the cement and so are efficiently coupled with the underground formations.

The sensors are connected to a surface recording laboratory, each by a separate line. The different lines are held in position by collars against the wall of the pipe. The sensors may be directly applied against the latter or else be housed in added sleeves enclosing said pipe.

The positioning of the different sensors must be integrated as much as possible in the procedure for installing the pipe. The pipe sections lowered successively into the well are relatively heavy and require powerful lifting means. To reduce the installation costs, positioning thereof takes place at a relatively rapid rate without special precautions.

The sections of the casing pipe are fairly robust for withstanding the stresses which may be applied thereto during handling. It is therefore important for the elements, which it is desired to position outside said pipe to provide seismic monitoring in depth, to be able to withstand shocks and compression against the walls of the well without failure. With standard diameters chosen for the borehole and the pipes, the annular spaces therebetween are generally reduced and so the protection of the added elements must take into account the insufficiency of free space.

The geophones used are often lowered to great depths. The signals which they produce in response to the waves picked up are weak. After propagation over transmission lines which may cover several kilometers, they are very greatly attenuated and often difficult to distinguish from the background noise. The attenuation is even greater if the transmission cables, which are embedded in the cement, have electric leaks.

SUMMARY OF THE INVENTION

The improved seismic monitoring device of the invention overcomes the above drawbacks. It is adapted to be installed in a borehole equipped with a casing pipe held in position by cementing and has at least one signal receiving unit fixed to the outside of the pipe and comprising at least one cavity containing sensor means and means for transferring, out of the borehole, the signals delivered by the sensor means.

It is characterized in that the pipe is fixed externally to projecting projection and anchorage elements, defining an open housing, with each reception unit being embedded and fixed in the housing. Each reception unit comprises an elongate support assembly including the cavity for the sensor means and at least a second cavity for means amplifying the signals delivered by the sensor means which communicates with the first cavity, with the support assembly being disposed in an external case having end-pieces adapted to be fixed to protection elements fixed to the pipe.

In one embodiment, the housing is oriented parallel to the longitudinal axis of the pipe and is defined by two lateral longitudinal members whose spacing apart is adapted to that of the unit, by a first stop and by a second stop. The signal receiving unit also comprises a first end-piece adapted to be fixed to the first stop, a second end-piece adapted to be fixed to the second stop and having a tubular extension for housing a first end portion of the support assembly, a cylindrical sleeve for isolating the support assembly and a tubular extension for connecting the sleeve to the first end-piece, with each signal receiving unit being fixed inside the housing.

The protection housing comprises, for example, an anchorage stud and the support assembly comprises a cavity adapted to fit on the anchorage stud and means for fixing it thereagainst.

The tubular extension is, for example, a shell comprising two semi-cylindrical elements fixed one against the other and held at a first end by engagement in one end of the cylindrical sleeve, with the opposite end of the tubular extension encompassing the second end-piece.

The device is further characterized in that it comprises a multi-conductor cable for supplying the amplification means with power and transmitting the amplified signals. The first end-piece is provided with means for blocking the cable, the first stop provided with a recess for passing the cable therethrough. The end portion of the support assembly, on the tubular extension side, is associated with sealed connection means for electrically connecting the different lines of the cable to electric conductors inside the support assembly.

The first end-piece comprises one face bearing against the first stop and a contact face slanted so that the tractive forces exerted on the cable cause jamming of the first end-piece against the wall of the pipe.

With such a structure:

each reception unit may be installed rapidly outside the pipe before being lowered into the borehole. Embedding and fixing thereof in the housing formed by the projecting protection elements protect it from the shocks or compression to which the pipe may be subjected during its insertion in the borehole or during its further inward movement, mounting of the component elements of each reception unit is facilitated by the fact that the inner support is isolated sealingly by a readily removable external case, embedding of the reception unit in its housing results in preventing any possible disengagement of the external case whatever the stresses which may be exerted, and any tractive force on the multi-conductor cable which may comprise the device results in reinforcing the jamming of each reception unit against the pipe.

BRIEF DESCRIPTION OF THE DRAWINGS

Other features and advantages of the device of the invention will be clearer from the following description of a preferred embodiment of the invention, given by way of example, with reference to the accompanying drawings in which:

FIG. 2 shows a front view of a signal receiving unit embedded in a housing against the external wall of a tube;

FIG. 3 shows a cross sectional view taken along the line AA in FIG. 1.

FIG. 4 shows a cross sectional view taken along the line BB in FIG. 1.

FIG. 5 shows a cross sectional view taken along the line CC in FIG. 1; and

FIG. 6 shows a cross sectional view taken along the line DD in FIG. 1.

DESCRIPTION OF THE PREFERRED EMBODIMENTS

Figure 1:
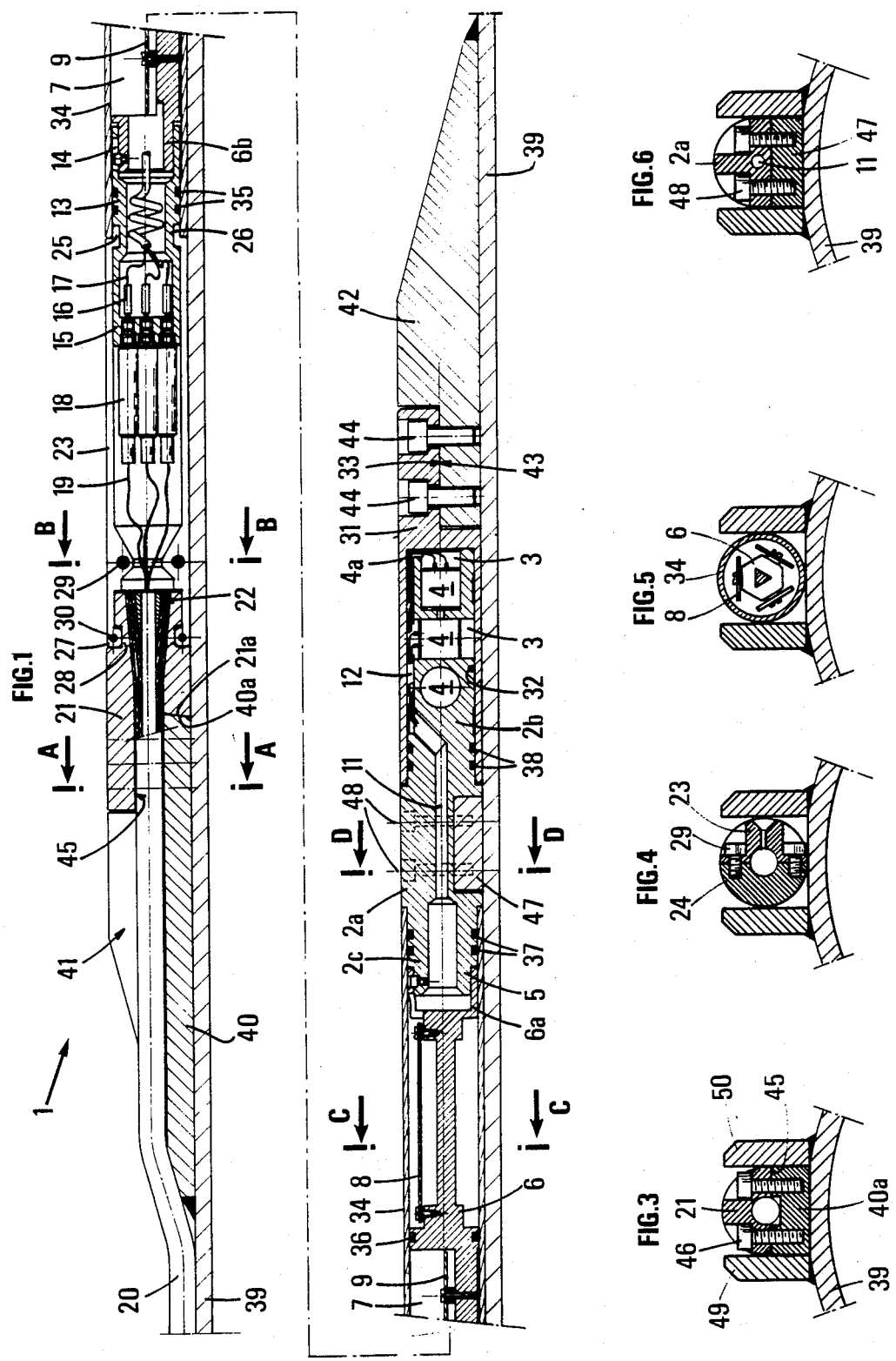
FIG. 1 shows in longitudinal section and in two complementary parts, joined together by a chain-dotted line, a reception unit applied against the external wall of a casing.

The device of the invention comprises one or more signal receiving units such as those shown in FIGS. 1 to 6.

Each reception unit 1 comprises (FIGS. 1, 2) a two part support assembly. The first part is a body 2 with a central portion 2a and two end portions 2b, 2c of a section less than that of the central portion. The end portion 2b has at least one cylindrical housing 3 for a sensor means 4 adapted to a type of measurement to be made.

The device has, for example, three cylindrical housings 3 whose axes are oriented along the edges of the trirectangular trihedron. The three sensor means for such as, for example, geophones, are disposed in the three cylindrical housings 3 for measuring the components along three axes of the seismic waves. The end portion 2c has a tubular extension 5. On this extension fits the end portion 6a of a support 6 forming the second part of the support assembly. This support 6 comprises lateral cavities 7 for electronic cards 8, 9. Screws 10 hold the extension 5 on the support 6. An axial passageway 11 communicating with a longitudinal groove 12 formed in the external surface of the end portion 2b is provided for passing the electric conductors 4a connecting the different sensor means 4 to the electronic cards 8. On the latter are mounted electronic elements of known type (not shown) for amplifying and filtering the signals delivered by the sensor means 4. If three sensor means 4 are used, three electronic cards are preferably used fixed at 120° from each other (FIG. 5) about support 6, with each of the electronic cards 8 being adapted for amplifying and filtering the signals from one of the sensor means 4.

On the other electronic card 9 are provided electronic components (not shown) for regulating the electronic supply voltages of the electronic elements carried by the card 8, as will be discussed hereafter.

Support 6 has at its end opposite the end portion 6a a tubular extension 6b, whose section is less than that of the support 6, on which is fitted a first tubular end of an electric connector or conductor 13. A fixing means of bayonet type, for example, fixes connector 13 to the end portion 6b. An end wall or plate 15 closes the opposite end of the connector 13. The wall 15 has, passing sealingly therethrough, a set of male pins 16. On these pins 16, on the side of the tubular extension 6b, are connected electric conductors 17 connected to the different electronic cards 8, 9. Female tags 18 are engaged on the different pins 16 on the opposite side of plate 15. To these tags 18 are soldered electric conductors 19 of a sheathed multi-conductor cable 20. This cable 20 is engaged in an axial opening of a first end-piece 21 and is fixed thereto by locking means 22 of any known type. The electric conductor 13 and the first end-piece 21 are joined together by a shell formed of two semi-cylindrical elements 23, 24 applied against each other so as to isolate, from the external medium, the electric conductors soldered to tags 18. Each semi-cylindrical or shell element 23, 24, 17 has, at a first end, a narrowed end portion 25. The external wall of the electric connector 13 has a groove 26 whose dimensions are adapted to those of the narrow end portion 25. Towards its opposite end, each semi-cylindrical element comprises an annular swelling 27. A circular groove 28 whose dimensions are adapted to those of swelling 27 is formed int eh first end-piece 21. Fixing screws 29, 30 secure the two semi-cylindrical elements 23, 24 together.

Each reception unit also comprises a second end-piece 31 having, towards a first end, an axial bore 32 whose cross section is adapted to the cross section of portion 2b of the body containing the sensors, and towards its opposite end a flat 33. A cylindrical sleeve 34 is engaged by a first end on portion 2a of the body and, at its opposite end, on the end portion of connector 13 fixed to the body. It is used for isolating support 6 from the external medium. Its length is sufficient for the narrowed end portion 25 of the shell elements 23, 24 to be engaged thereinside. Grooves are formed at the periphery of the electric connector 13 of support 6, of portion 2a of the body and of the opposite portion 2b thereof, respectively for seals 35, 36, 37 and 38.

The device also comprises means for fixing each reception unit 1 to a casing (pipe column) 39 on the outer side thereof. These fixing means comprise a first stop 40 fixed to the wall of the casing and having a longitudinal recess 41 for passing the multi-conductor cable 20. The fixing means also comprise a second stop 42 fixed to the wall of the casing and having a bearing face 43 against which is applied flat surface 33 of the second end-piece 44. Fixing screws 41 secure the flat surface 33 against the bearing face 43.

The first end-piece 21 has a flat surface 45 and the first stop 40 includes an application surface for associated with flat surface 45.

Screws 45 (FIG. 2) fix the end piece 21 to the first stop 40 together. The first end-piece 21 and the first stop 40 also comprise two faces opposite each other respectively 21a and 40a, slanted so that any tractive force on the multi-conductor cable 20 substantially in the direction of extension of the casing results in a applying the first end-piece further thereagainst.

The fixing means also comprise a stud 47 fast with casing 39 which fits into a lateral recess formed in the central portion 2a of the body. Screws 48 (FIG. 2) fix the body to stud 47.

Finally, the fixing means comprise two lateral longitudinal members 49, 50 (FIG. 2) which are welded to the casing along two generatrices thereof. Their spacing apart is substantially equal to the lateral space requirement of each reception unit.

Their thickness is sufficient to protect them from possible lateral shocks. The fixing means define an external housing 51 for each reception unit.

The arrangement of each receptor unit facilitates its fitting.

With support 6 of the electronic part connected and fixed to body 2 containing the sensor means 4 by means of screws 10 and joined to the electric connector 13 by the bayonet fixing means, the different electric connections are made between the electric conductors associated with the sensors 4 and the electronic cards 8, 9 and between the latter and conductors 17 soldered to the male pins 16 of connector 13. The second end-piece 31 is driven in to isolate portion 2a of the body 2 and then sleeve 34 is positioned so that it completely covers the support 6. The multi-conductor cable 20 is fixed to the first end-piece 21 and its conductors are soldered to tags 18. After engagement of the latter on their respective male pins, the two semi-cylindrical portions or shell elements 23, 24 are positioned so that their narrowed and portion 25 is driven under the end portion of sleeve 34 and so that the annular swelling 27 is engaged in the circular groove 28 and holds the first end-piece 21 in position. The two half-shells 23, 24 are then fixed together by screws 29, 30.

The reception unit 1 thus mounted is positioned in housing 51 outside casing 39 so that the first end-piece 21 comes into abutment against the first stop 40 and flat 33 is applied against the second stop 42 and screws 44 and 46 are fixed at both ends. The reception unit 1 is then firmly held in position not only laterally but also longitudinally and well protected from shocks.

In the embodiment in which each reception unit 1 comprises three sensors, it can be connected to a surface laboratory by a cable 20 having seven conductors for example. Three conductors are used for transmitting to the surface the signals picked up after amplification thereof by the electronic means of card 8, and another forms their common electric ground. On two other conductors are applied for example two symmetrical electrical voltages (+15 volt, −15 volt). The seventh conductor forms the power supply ground. The electronic means on card 9 are used for regulating the symmetrical electrical voltages applied to the amplifiers and filters of card 8.

Without departing from the scope of the invention, multi-conductor power supply and data transmission cable 20 may be replaced by any other power supply and transmission means.

What is claimed is:

1. A device for the seismic monitoring of a petroleum deposit, the device being adapted to be installed in a bore hole equipped with a casing pipe held in position by cementing, the device comprising at least one signal receiving unit including sensor means and means for transferring signals delivered by the sensor means out of the bore hole, projecting protection and anchorage means fixed to an exterior of the pipe casing for defining an open housing means having each signal receiving unit embedded and fixed therein, each signal receiving unit comprises an elongate support assembly including a first cavity for accommodating said sensor means and at least a second cavity communicating with said first cavity and being adapted to accommodate an amplifying means for amplifying signals of said sensor means, said elongate support assembly is disposed in an external case including end-pieces adapted to be fixed to said protection and anchorage means, and conductor means are provided for connecting each of said sensor means to the signal receiving unit, said conductor means including sleeve means fixedly secured to the elongate support assembly.

2. A device for the seismic monitoring of a petroleum deposit, the device being adapted to be installed in a bore hole equipped with a casing pipe held in position by cementing, the device comprising at least one signal receiving unit including sensor means and means for transferring signals delivered as the sensor means out of the bore hole, projecting protection and anchorage means fixed to an exterior of the pipe casing for defining an open housing means having each signal receiving unit embedded and fixed therein, each signal receiving unit comprises an elongate support assembly including a first cavity for accommodating said sensor means and at least a second cavity communicating with said first cavity and being adapted to accommodate an amplifying means for amplifying signals of said sensor means, said elongate support assembly is disposed in an external case including end-pieces adapted to be fixed to said protection and anchorage means, and wherein said housing is disposed substantially parallel to a longitudinal axis of the casing pipe, said projection and anchorage means includes to longitudinally extending members laterally spaced at a distance sufficient to accommodate said signal receiving unit, a first stop and a second stop, and wherein said signal receiving unit further comprises a first end piece adapted to be fixed to the first stop, a second end piece adapted to be fixed to said second stop and having a tubular extension for housing a first end portion of the support assembly, a cylindrical sleeve means for isolating said support assembly, and a tubular extension for connecting the sleeve means to said first-end piece, and means are provided for fixing each signal receiving unit inside said housing.

3. The device as claimed in claim 2, wherein said housing comprises an anchorage stud, said support assembly comprises a cavity adapted to fit on said anchorage stud, and means are provided for fixing said support assembly to said anchorage stud.

4. The device as claimed in claim 2, wherein said tubular extension includes a shell comprising two semi-cylindrical elements fixed one against the other and held at a first end by engagement in one end of the cylindrical sleeve means, and wherein an opposite end of the tubular extension encompasses the second end piece.

5. A device for the seismic monitoring of a petroleum deposit the device being adapted to be installed in a bore hole equipped with a casing pipe held in position by cementing, the device comprising at least one signal receiving unit including sensor means and means for transferring signals delivered by the sensor means out of the bore hole, projecting protection and anchorage means fixed to an exterior of the pipe casing for defining an open housing means having each signal receiving unit embedded and fixed therein, each signal receiving unit comprises an elongate support assembly including a first cavity for accommodating said sensor means and at least a second cavity communicating with said first cavity and being adapted to accommodate an amplifying means for amplifying signals to said sensor means, said elongate support assembly is disposed in an external case including end-pieces adapted to be fixed to said protection and anchorage means, wherein said support assembly comprises a body having said first and second cavities therein and a support means including cavity means for accommodating electronic cards, and wherein said body and the support means are fitted one in the other.

6. The device as claimed in one of claims 2, 3, or 4, further comprising a multi-lane cable for supplying the amplifying means and filtering means with power and for transmitting amplified signals, said first end piece includes means for blocking said multi-line cable, said first stop is provided with a recess for enabling said multi-line cable to pass therethrough, and sealed connection means are provided on the tubular extension side of the device for electrically connecting different lines of said multi-line cable to electric conductors inside said support assembly.

7. The device as claimed in claim 6, wherein said first end piece comprises one face bearing against the first stop, and a contact face slanted so that tractive forces exerted on the multi-line cable cause jamming of the first end piece against a wall of the casing pipe.

8. The device as claimed in one of claims 1 or 2, wherein each support assembly comprises a plurality of first cavities for accommodating a plurality of sensor means, and wherein each of said sensor means includes directional sensors oriented in different directions with a signal delivered by the respective sensors being applied to the amplifying means and filtering means.

9. The device as claimed in one of claims 1 or 2, comprising a plurality of separate signal receiving units each disposed in a respective housing outside the casing pipe.

10. The device as claimed in one of claims 1 or 2, wherein a plurality of separate signal receiving units are provided and are disposed at a distance from each other in a longitudinal direction of said casing pipe.

11. The device as claimed in claim 2, wherein said support assembly comprises a body having said first and second cavities therein and a support means including cavity means for accommodating electronic cards, and wherein the body and the support means are fitted one in the other.

12. The device as claimed in claim 5, wherein each support assembly comprises a plurality of first cavities for accommodating a plurality of sensor means, and wherein each of said sensor means includes directional sensors oriented in different directions with a signal delivered by the respective sensors being applied to the amplifying means and filtering means.

13. The device as claimed in claim 5, comprising a plurality of separate signal receiving units each disposed in a respective housing outside the casing pipe.

14. The device as claimed in claim 5, wherein a plurality of separate signal receiving units are provided and are disposed at a distance from each other in a longitudinal direction of said casing pipe.

* * * * *